(12) United States Patent
Wu et al.

(10) Patent No.: US 8,768,300 B2
(45) Date of Patent: *Jul. 1, 2014

(54) REMOTE CONTROL METHOD AND SYSTEM FOR SMART CARD

(75) Inventors: Chuanxi Wu, Guangdong Province (CN); Jingwang Ma, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 164 days.

This patent is subject to a terminal disclaimer.

(21) Appl. No.: 13/259,326

(22) PCT Filed: Dec. 24, 2009

(86) PCT No.: PCT/CN2009/075981
§ 371 (c)(1),
(2), (4) Date: Feb. 28, 2012

(87) PCT Pub. No.: WO2011/022916
PCT Pub. Date: Mar. 3, 2011

(65) Prior Publication Data
US 2012/0149357 A1 Jun. 14, 2012

(30) Foreign Application Priority Data

Aug. 28, 2009 (CN) .......................... 2009 1 0166863

(51) Int. Cl.
*H04M 11/00* (2006.01)

(52) U.S. Cl.
USPC ........ 455/408; 455/414.1; 455/418; 455/466; 379/161; 379/168; 379/48; 709/210; 709/223; 709/203; 713/193; 713/194; 726/17; 726/27; 726/35; 726/36; 340/426.1; 340/438; 340/5.8; 370/270; 370/338

(58) Field of Classification Search
USPC ................ 455/404.2, 410, 414.1, 421, 432.1, 455/456.1, 418, 422.1, 432.3, 435.1, 466; 370/328–338, 270; 379/161, 168, 184, 379/194, 48, 201.02; 709/203, 210, 223; 713/193, 194; 726/4, 17, 27, 23, 35, 726/36; 340/426.1, 438, 507, 541, 5.8, 6.1
See application file for complete search history.

(56) References Cited

U.S. PATENT DOCUMENTS

| 5,600,708 A | * | 2/1997 | Meche et al. .................. 455/411 |
| 5,898,783 A | * | 4/1999 | Rohrbach ..................... 340/5.31 |
| 6,542,730 B1 | * | 4/2003 | Hosain .......................... 455/410 |

(Continued)

FOREIGN PATENT DOCUMENTS

| CN | 1780485 A | 5/2006 |
| CN | 1810052 A | 7/2006 |

(Continued)

*Primary Examiner* — Quan M Hua
(74) *Attorney, Agent, or Firm* — Scully, Scott, Murphy & Presser, P.C.

(57) ABSTRACT

The present invention provides a remote control method and system for a smart card. The remote control method for a smart card includes the following steps: a smart card management platform receives a request for destruction of a smart card from a user (S101); the smart card management platform carries out short message interactive processing with a terminal via a mobile network platform according to the request to make the terminal destruct the smart card (S103).

16 Claims, 10 Drawing Sheets

(56) References Cited

U.S. PATENT DOCUMENTS

| | | | |
|---|---|---|---|
| 6,662,023 B1* | 12/2003 | Helle | 455/558 |
| 7,336,974 B2 | 2/2008 | Choi | |
| 2002/0069259 A1* | 6/2002 | Kushwaha et al. | 709/217 |
| 2005/0153742 A1 | 7/2005 | Choi | |
| 2008/0070590 A1* | 3/2008 | Miyajima et al. | 455/456.3 |
| 2010/0015942 A1* | 1/2010 | Huang et al. | 455/404.1 |
| 2012/0149331 A1* | 6/2012 | Wu et al. | 455/411 |
| 2012/0149332 A1* | 6/2012 | Wu et al. | 455/411 |
| 2012/0149333 A1* | 6/2012 | Wu et al. | 455/411 |

FOREIGN PATENT DOCUMENTS

| | | |
|---|---|---|
| CN | 1941958 A | 4/2007 |
| CN | 1980459 A | 6/2007 |
| CN | 101018375 A | 8/2007 |
| CN | 101309518 A | 11/2008 |
| CN | 101499190 A | 8/2009 |
| EP | 1220556 A1 | 3/2002 |
| WO | WO 2008092336 * | 8/2008 |

* cited by examiner

REMOTE CONTROL METHOD AND SYSTEM FOR SMART CARD

FIELD OF THE INVENTION

The present invention relates to communication field, in particular to a remote control method and system for a smart card.

BACKGROUND OF THE INVENTION

Electronic payment refers to the realization of circulation and payment of fund in a computer network system in a form of electronic data storage and transfer, using commercial electronic tools and all kinds of electronic money as media and computer technology and communication technology as means.

In recent years, with the combination of the technologies such as the Internet, mobile communication and computer and so on, mobile electronic commerce represented by mobile payment emerges as the times require. As a new electronic payment manner, the mobile payment possesses quite a few characteristics. For instance, payment can be made anywhere and anytime conveniently, fast, and at a low cost. Consumers can fulfill financial management or transactions, and enjoy the convenience brought forth by the mobile payment, as long as they have a mobile phone. Today, mobile phone payment is becoming a new highlight of electronic commerce.

In addition, a recent survey shows that 82% of the interviewees are concerned that if their mobile phones are lost or stolen, someone will use the information stored in their mobile phones (including the smart card) for fraud. Meanwhile, 90% of the interviewees worry that their personal data and financial data will be lost if their mobile phones are lost, and 72% of the interviewees admit that the information stored in their mobile phones is very important and irreplaceable. Since a user use a mobile phone to take part in a variety of activities, such as electronic payment and so on, loss of the mobile phone is surely a disaster for the user. In the survey, 91% of the interviewees even suspect the loss of a mobile phone for electronic payment to be a destructive strike to them. Meanwhile, as people are increasingly dependent on mobile phones, service providers must let their customers feel secured. It is a good thing to use mobile phones more widely. However, the mobile operators must enhance the security and management level of users' personal data, so as to be well prepared for the potential dangers. Regarding the handling of losing and stealing of a mobile phone for electronic payment, there are some solutions proposed. However, these solutions more or less have some shortcomings, such as: the system is greatly different from the current payment flow, and requires great changes; or the system is not secure enough, and the payment information of the user are unlawfully used by others to forge payment; or the system fails to deal with the loss of a mobile phone in time, which results in huge loss for the user and makes the user feel insecure.

No effective solution regarding the handling concerning losing and stealing of a mobile phone for electronic payment is provided currently. In the related art, the electronic payment security system is greatly different from the current payment flow and requires great changes to be made on the current payment flow, or great inconvenience with the users is resulted from failing to take into account the short message delay, loss, etc. or failing to consider the balance between system load and security of user's smart card.

SUMMARY OF THE INVENTION

The present invention is provided in view of the problem in the related art that, regarding the handling of losing and stealing of a mobile phone for electronic payment, the system is greatly different from the current payment flow and requires great changes, or great inconvenience with the users is resulted from failing to take into account the short message delay, loss, etc. or failing to consider the balance between system load and security of user's smart card. Thus, the present invention mainly aims to provide a remote control method and system for a smart card to solve the above problem.

In order to achieve the above object, according to one aspect of the present invention, a remote control method for a smart card is provided.

The remote control method for a smart card according to an embodiment of the present invention comprises: a smart card management platform receiving a request for destruction of the smart card from a user; and the smart card management platform carrying out short message interactive processing with the terminal side via a mobile network platform according to the request, to make the terminal side destruct the smart card.

Preferably, the step of the smart card management platform carrying out short message interactive processing with the terminal side via a mobile network platform according to the request comprises: if a mobile station is in a normal-use state, the mobile station receiving a short message of destruction transmitted by the mobile network platform; and the mobile station executing, according to the short message of destruction, a destruction command to destruct the smart card.

Preferably, after the mobile station destructs the smart card, the method further comprises: the smart card is in a destructed state.

Preferably, after the smart card is in a destructed state, the method further comprises: the mobile station returning a short message of successful execution to the mobile network platform.

Preferably, the step of the mobile station executing a destruction command to destruct the smart card comprises: the mobile station destructing the smart card in a manner of destructing hardware of the smart card; or the mobile station destructing the smart card in a manner of executing a preset software executive.

Preferably, the step of the smart card management platform carrying out short message interactive processing with the terminal side further comprises: if the smart card management platform does not receive, in a pre-determined time period, a short message of successful execution returned by the terminal side, the smart card management platform continuing transmission of the short message of destruction to the terminal side via the mobile network platform.

Preferably, the step of the smart card management platform continuing transmission of the short message of destruction to the terminal side via the mobile network platform comprises: if times for the smart card management platform transmitting the short message of destruction to the terminal side via the mobile network platform exceed set times, the smart card management platform transmitting the short message of destruction to the terminal side at a pre-determined time interval.

Preferably, the step of the smart card management platform continuing transmission of the short message of destruction to the terminal side via the mobile network platform comprises: if a mobile station in which the smart card is located is in an off-line state, the smart card management platform updating a state of the smart card management platform to a wait-for-destruction state.

Preferably, the method further comprises: if the mobile station, in which the smart card is located, in the off-line state is powered on or enters a service area, the smart card management platform continuing transmission of the short message of destruction to the mobile station in which the smart card is located.

Preferably, the step of the smart card management platform continuing transmission of the short message of destruction to the mobile station in which the smart card is located comprises: if times for the smart card management platform transmitting the short message of destruction to the terminal side exceed set times, the smart card management platform transmitting the short message of destruction to the terminal side at a pre-determined time interval.

Preferably, the method further comprises: if a mobile station in which the smart card is located is in an off-line state, the smart card being updated to a wait-for-destruction state.

Preferably, after the smart card is updated to a wait-for-destruction state, the method further comprises: if the mobile station, in which the smart card is located, in the off-line state restores to a normal-use state and registers in the mobile network platform, the mobile network platform transmitting a short message command of destruction to the mobile station in which the smart card is located, and the mobile station executing the short message command of destruction.

Preferably, the off-line state comprises one of the following: the mobile station is in a power-off state; the mobile station is not in a service area.

Preferably, after the smart card management platform receives an application from the user, the method further comprises: the smart card management platform judging whether the smart card is valid.

Preferably, before the smart card management platform carries out short message interactive processing with a terminal side via a mobile network platform according to the request, the method further comprises: the mobile network platform performing security authentication with the terminal side.

Preferably, the step of the mobile network platform performing security authentication with the terminal side comprises: after receiving a short message of destruction, the mobile station in which the smart card is located determining whether the short message of destruction is from the smart card management platform; if not, processing as an ordinary short message; if yes, performing corresponding smart card destruction operation according to an instruction of the short message of destruction, and the mobile station in which the smart card is located returning a short message of successful execution to the smart card management platform.

Preferably, after the smart card management platform receives the request for destruction of the smart card from the user, the method further comprises: the smart card management platform searching for state information of the mobile station in which the smart card is located via the mobile network platform.

Preferably, the step of the smart card management platform searching for state information of the mobile station in which the smart card is located via the mobile network platform comprises: the smart card management platform searching for, via the mobile network platform, state information of the mobile station in which the smart card is located according to a mobile identification code and location area information of the mobile station.

Preferably, the method further comprises: the smart card management platform transmitting an instruction of destruction to the terminal side through Over the Air technology, wherein the Over the Air technology comprises a bearer independent protocol.

To achieve the above object, according to another aspect of the present invention, a remote control system for a smart card is provided.

The system according to an embodiment of the present invention comprises: if the smart card supervision platform finds that a user uses the smart card illegally, a smart card supervision platform notifying a smart card management platform to destruct the smart card; and the smart card management platform carrying out short message interactive processing with a terminal side to make the terminal side accomplish the destruction of the smart card.

Preferably, the terminal side comprises a mobile station and the smart card, and the step of the smart card management platform carrying out short message interactive processing with a terminal side comprises: the smart card management platform searching for state information of the mobile station in which the smart card is located via a mobile network platform; if the mobile station is in a normal-use state, the mobile network platform transmitting a short message command of destruction to the mobile station in which the smart card is located; and the mobile station executing the short message command of destruction to destruct the smart card.

Preferably, the step of the smart card management platform searching for state information of the mobile station in which the smart card is located via the mobile network platform comprises: the smart card management platform searching for, via the mobile network platform, state information of the mobile station in which the smart card is located according to a mobile identification code and location area information of the mobile station in which the smart card is located.

Preferably, after the mobile station executes the short message command of destruction to destruct the smart card, the method further comprises: the mobile station transmitting a short message of successful execution to the mobile network platform; and the mobile network platform changing a state of the smart card to a destructed state.

Preferably, after the smart card management platform searches for state information of the mobile station in which the smart card is located via the mobile network platform, the method further comprises: if the mobile station in which the smart card is located is in an off-line state, the mobile network platform updating a state of the mobile network platform to a wait-for-destruction state.

To achieve the above object, according to another aspect of the present invention, a remote control system for a smart card is provided.

The system according to an embodiment of the present invention comprises: a mobile network platform, configured to transmit a short message command of destruction; and a mobile station, configured to execute the short message command of destruction to destruct the smart card.

Preferably, the system further comprises: a smart card management platform, configured to receive a request from a user and carry out short message interaction with the mobile station via the mobile network platform.

Preferably, the mobile network platform is further configured to search for state information of the mobile station in which the smart card is located.

To achieve the above object, according to another aspect of the present invention, a mobile terminal is provided.

The mobile terminal according to an embodiment of the present invention comprises: a reception module, configured to receive a request for destruction of the smart card; and an execution module, configured to execute the destruction of the smart card.

Preferably, the terminal station further comprises: a transmission module, configured to transmit a short message of successful execution.

To achieve the above object, according to another aspect of the present invention, a mobile network platform is provided.

Preferably, a transmission module is configured to transmit a short message command of destruction to a mobile station; a changing module is configured to update a state of a smart card, wherein if the mobile station and the smart card are in on-line states and destruction is implemented successfully, the state of the smart card is updated to a destructed state, and if the mobile station and the smart card are in off-line states, the state of the smart card is updated to a wait-for-destruction state.

Preferably, the mobile network platform further comprises: a timing module, configured to set a time at which the short message command of destruction is transmitted to the mobile station.

Preferably, the transmission module is further configured to transmit an instruction of destruction through Over the Air technology, wherein the Over the Air technology comprises a bearer independent protocol.

In the present invention, a smart card management platform receives a request for destructing a smart card from a user; the smart card management platform carries out short message interactive processing with a terminal side via a mobile network platform according to the request, to cause the terminal side to destruct the smart card. Such a method solves the problem in the prior art that, regarding the handling of losing and stealing of a mobile phone for electronic payment, the system is greatly different from the current payment flow and requires great changes, or great inconvenience with the users is resulted from failing to take into account the short message delay, loss, etc. or failing to consider the balance between system load and security of user's smart card. So that by the present invention when the smart card and the mobile station in which the smart card is located are robbed, lost, stolen or illegally used, the user can apply to the smart card supervision department for remote destruction of the smart card, so as to protect the security of the user to a maximum extent, and provide stronger security guarantee for the payment system.

BRIEF DESCRIPTION OF THE DRAWINGS

The drawings herein are used to provide further understanding of the present invention and form a part of the specification. The schematic embodiments of the present invention and the illustrations thereof are used to explain the present invention rather than unduly limit the present invention. In the drawings.

DETAILED DESCRIPTION OF THE EMBODIMENTS

It shall be noted that the embodiments of the present application and the features of the embodiments can be combined with each other if there is no conflict. The present invention will be described hereinafter in detail with reference to the drawings and the embodiments.

Method Embodiment

According to an embodiment of the present invention, a remote control method for a smart card is provided.

Figure 1:
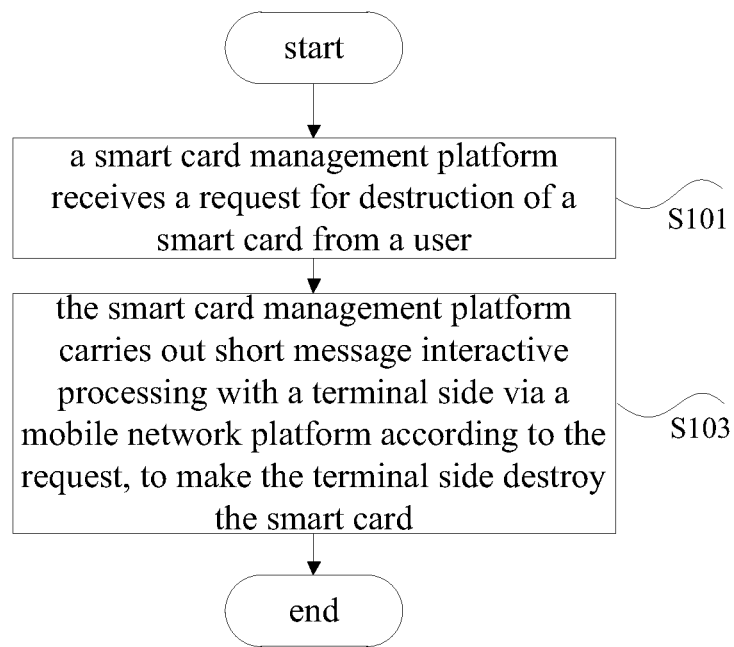
FIG. 1 is a flowchart of the remote control method for a smart card according to an embodiment of the present invention.

FIG. 1 is a flowchart of the remote control method for a smart card according to an embodiment of the present invention.

As shown in FIG. 1, the method includes the following Step S101 to Step S103.

Step S101, a smart card management platform receives a request for destruction of a smart card from a user; and Step S103, the smart card management platform carries out short message interactive processing with a terminal side via a mobile network platform according to the request, to make the terminal side destroy the smart card.

The implementing process of the embodiment of the present invention is described in detail as follows in conjunction with examples.

Figure 2:
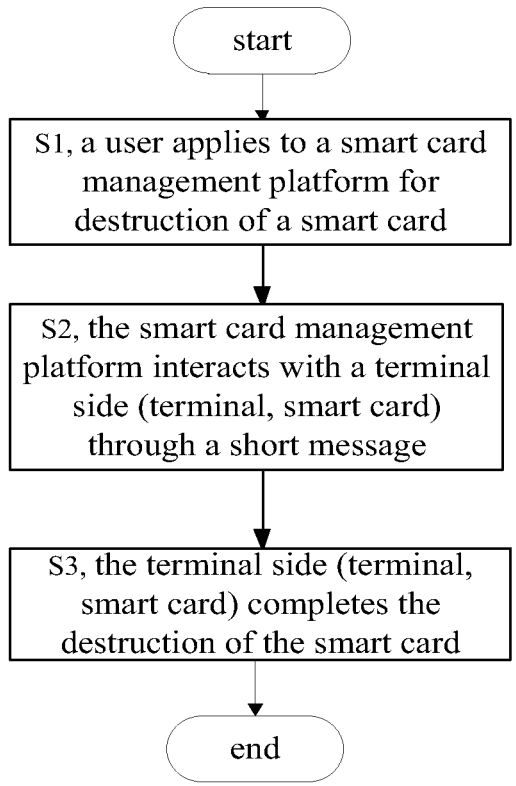
FIG. 2 is a preferable flowchart of the remote control method for a smart card according to an embodiment of the present invention.

FIG. 2 is a preferable flowchart of the remote control method for a smart card according to an embodiment of the present invention.

As shown in FIG. 2, according to one aspect of the present invention, a method for realizing remote destruction of an electronic payment smart card based on a short message is provided, which includes the steps as follows.

Step S1, a user applies to a smart card management platform for destruction of a smart card.

Step S2, the smart card management platform carries out, via a mobile network platform, short message interactive processing with a terminal side in which the smart card is located to implement the destruction of the smart card.

Step S3, the terminal executes and completes the destruction of the smart card.

Figure 4:
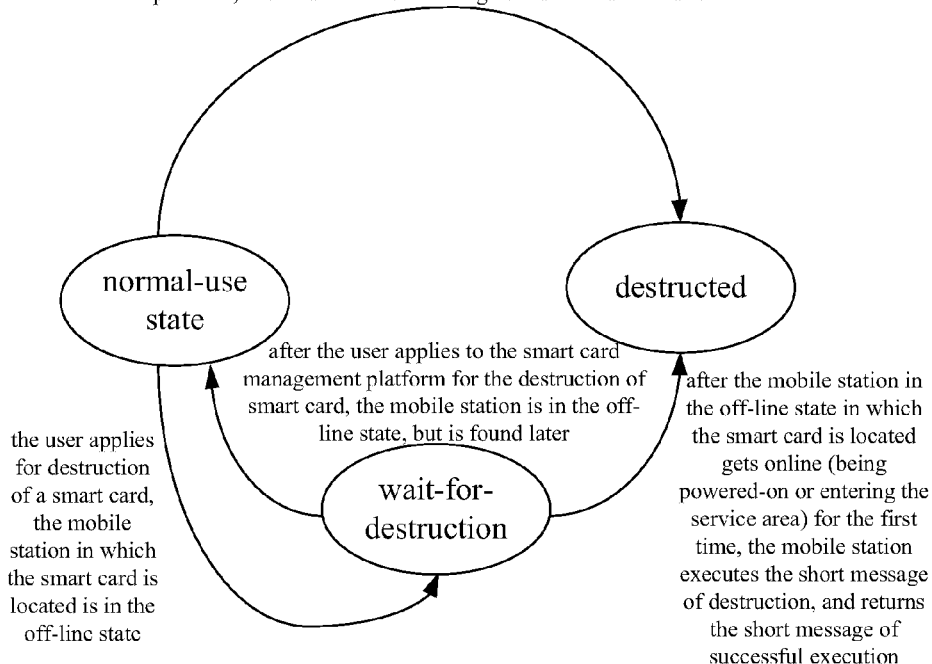
FIG. 4 is a schematic diagram of a network side state machine according to an embodiment of the present invention.

FIG. 4 is a schematic diagram of a network side state machine according to an embodiment of the present invention.

As shown in FIG. 4, the network side terminal includes: a normal-use state, a wait-for-destruction state, and a destructed state.

When the user in the normal-use state applies for destruction of a smart card, if the mobile station in which the smart card is located is in a normal power-on state, the mobile station executes the short message of destruction transmitted by the smart card management platform, returns a short message of successful execution. At this time, the destructed state is entered and the smart card is destructed. If the mobile station in which the smart card is located is in an off-line state, the wait-for-destruction state is entered.

After the user in the wait-for-destruction state applies to the smart card management platform for destruction of the smart card, if the mobile station is in the off-line state but is found later, then the user returns to the normal-use state at this time. After the mobile station in the off-line state in which the smart card is located gets online (being powered-on or entering the service area) for the first time, the mobile station executes the short message of destruction, and returns the short message of successful execution, at this time, the smart card is destructed.

Figure 5:
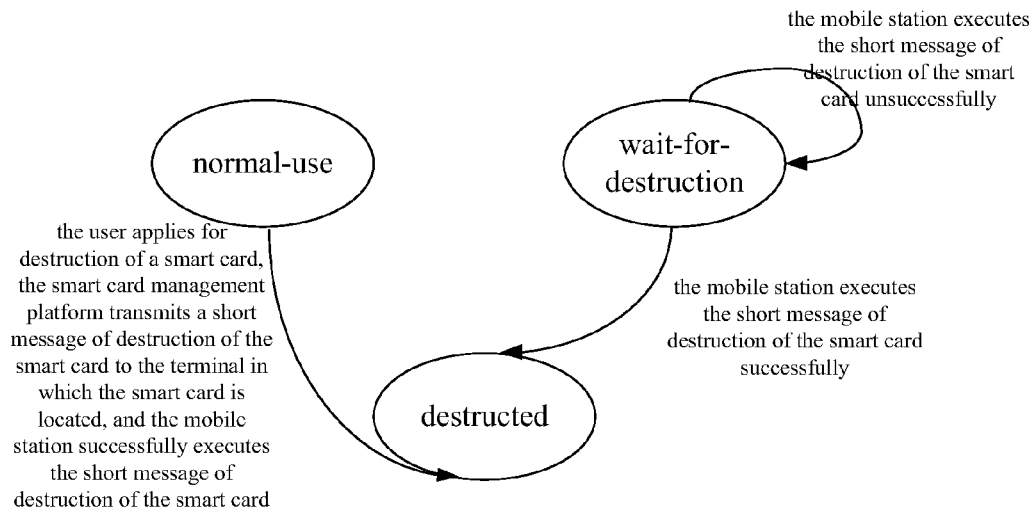
FIG. 5 is a schematic diagram of a terminal side state machine according to an embodiment of the present invention.

FIG. 5 is a schematic diagram of the terminal side state machine according to an embodiment of the present invention.

As shown in FIG. 5, the terminal side terminal includes: a normal-use state, a wait-for-destruction state and a destructed state.

The user in the normal-use state applies for destruction of a smart card, the smart card management platform transmits a short message of destruction of the smart card to the terminal in which the smart card is located, and the mobile station successfully executes the short message of destruction of the smart card.

When the reply of the terminal in the wait-for-destruction state is overtime, the mobile station executes the short message of destruction of the smart card unsuccessfully; when the reply of the terminal in the wait-for-destruction state is not overtime, the mobile station executes the short message of destruction of the smart card successfully.

Figure 6:
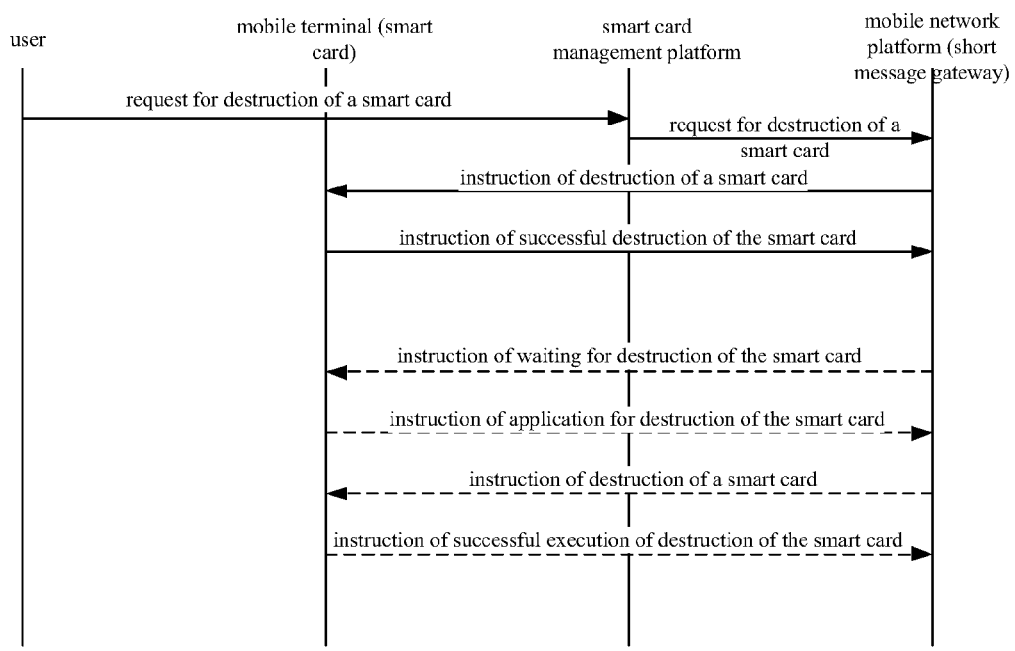
FIG. 6 is a schematic diagram of system short message interaction according to an embodiment of the present invention.

FIG. 6 is a schematic diagram of system short message interaction according to an embodiment of the present invention.

As shown in FIG. 6, the system short message interaction includes: a user, a mobile terminal (smart card), a smart card management platform, and a mobile network platform (a short message gateway).

In the above, the user transmits a request of destruction of the smart card to the smart card management platform, and the smart card management platform forwards, after receiving the request, the request to the mobile network platform.

After receiving the request for destruction of the smart card, the mobile network platform transmits an instruction of destruction of the smart card to the mobile terminal smart card. After processing the relevant request, the mobile terminal returns to the mobile network platform an instruction of successful destruction of the smart card.

Preferably, when waiting for the instruction of destruction of the smart card from the mobile terminal, the mobile network platform receives the instruction of the application for destruction of the smart card from the mobile terminal, and transmits an instruction of destruction of the smart card to the mobile terminal. After the mobile network platform receives the instruction of success, it indicates that the instruction of destruction of the smart card has been successfully executed by the mobile terminal.

Figure 7:
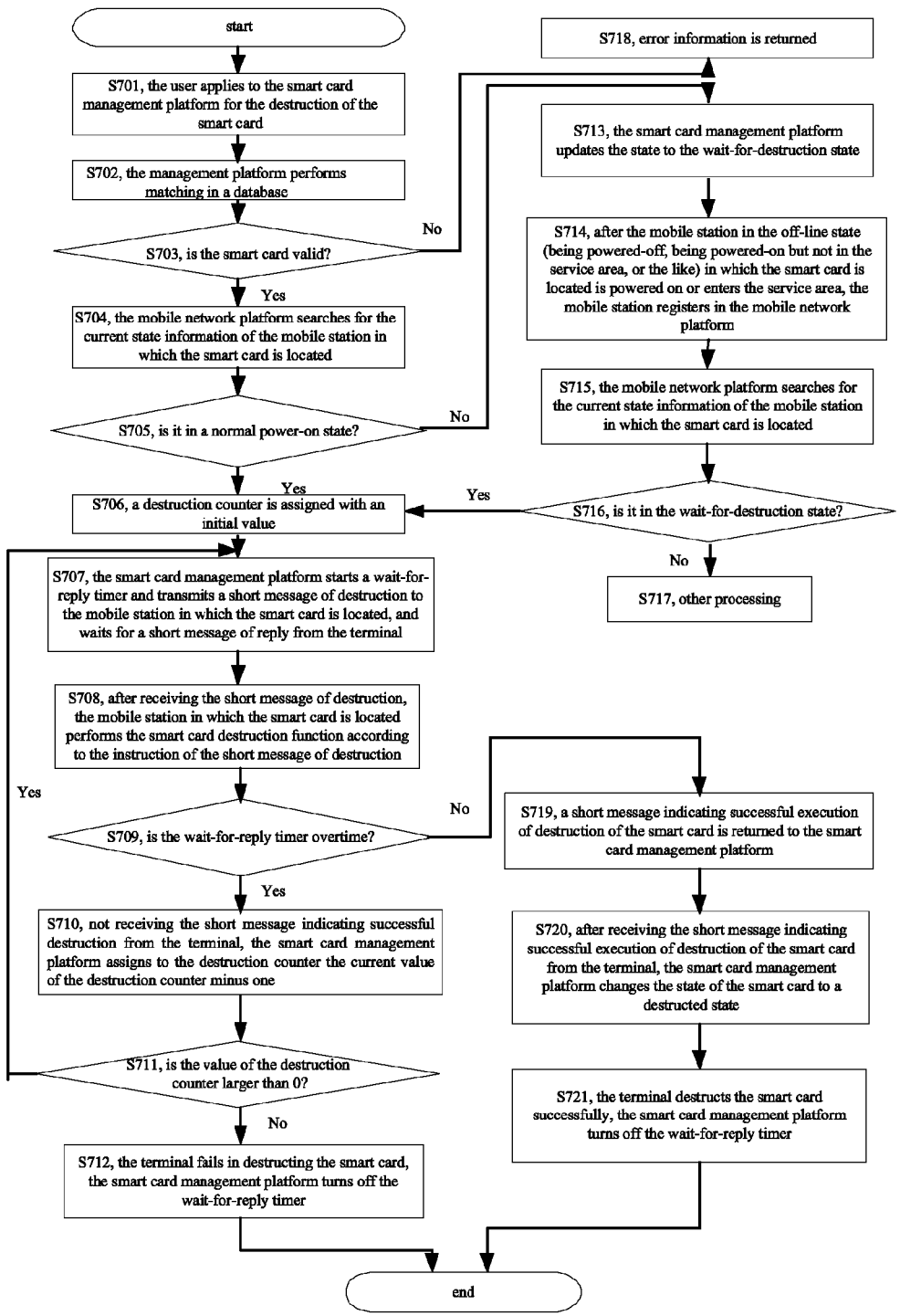
FIG. 7 is a preferable flowchart of the remote control method for a smart card according to an embodiment of the present invention.

FIG. 7 is a preferable flowchart of the remote control method for a smart card according to an embodiment of the present invention.

As shown in FIG. 7, Step S2 in FIG. 2 can include the steps as follows.

Step S701, the user applies to the smart card management platform for destruction of the smart card, the smart card management platform receives the request for destruction (the request for destruction of the smart card is transmitted to the smart card management platform) of the smart card which is transmitted to the smart card management platform by the user.

Step S702, the management platform performs matching in a database.

Step S703, it is judged whether the smart card is valid; if the smart card is invalid, step S718 is carried out, a failure message of error is returned, and the step is ended; if the smart card is valid, step S704 is carried out.

Step S704, the smart card management platform searches for current state information of the mobile station in which the smart card is located via the mobile network platform.

Step S705, it is judged whether the mobile station in which the smart card is located is in a normal power-on state is judged, if yes, step S706 is carried out, otherwise, step S713 is carried out.

Step S706, a destruction counter is assigned with an initial value.

Step S707, the smart card management platform starts a wait-for-replay timer, transmits a short message of destruction to the mobile station in which the smart card is located, and waits for a short message of reply from the terminal.

Step S708, after receiving the short message of destruction, the mobile station in which the smart card is located performs a security authentication on the source of the short message to determine whether it is an short message of destruction from the smart card management platform, if not, the short message of destruction is processed as an ordinary short message; if yes, the corresponding smart card destruction function is performed according to the instruction of the short message of destruction, and a short message indicating successful destruction is returned to the smart card management platform after the corresponding smart card destruction function is performed successfully.

Step S709, it is judged whether the wait-for-reply timer is overtime, if yes, step S710 is carried out, otherwise, step S719 is carried out.

Step S710, the wait-for-reply timer is overtime, however, the smart card management platform has not received from the terminal the short message indicating successful destruction, the smart card management platform assigns to the destruction counter the current value of the destruction counter minus one.

Step S711, it is judged whether the value of the destruction counter is large than 0, if yes, step S707 is carried out to re-transmit the short message of destruction, otherwise, step S712 is carried out.

Step S712, the terminal fails in destructing the smart card, the smart card management platform turns off the wait-for-reply timer, and the process of destructing the smart card is ended.

Step S713, the smart card management platform updates the state of the mobile station to the wait-for-destruction state.

Step S714, after the off-line mobile station in which the smart card is located is powered on or enters the service area, the mobile station registers in the mobile network platform.

Step S715, the mobile network platform inquires the current state information of the mobile station in which the smart card is located.

Step S716, it is judged whether the current state is the wait-for-destruction state, if yes, step S706 is carried out; otherwise, step S717 is carried out.

Step S717, the relevant processing is carried out. The terminal fails in destructing the smart card, the smart card management platform turns off the wait-for-reply timer, and the process of destructing the smart card is ended.

Step S719, the waiting is overtime, then a short message indicating successful execution of destruction of the smart card is returned to the smart card management platform.

Step S720, after receiving the short message indicating successful execution of destruction of the smart card from the terminal, the smart card management platform changes the state of the smart card to a destructed state.

Step S721, the terminal destructs the smart card successfully, the smart card management platform turns off the wait-for-reply timer, and the process of destructing the smart card is ended.

Preferably, after receiving the short message of destruction of the smart card, the mobile station in which the smart card is located performs a security authentication on the source of the short message before performing the corresponding smart card destruction function, to determine whether the short message is a short message of destruction from the smart card management platform.

Figure 8:
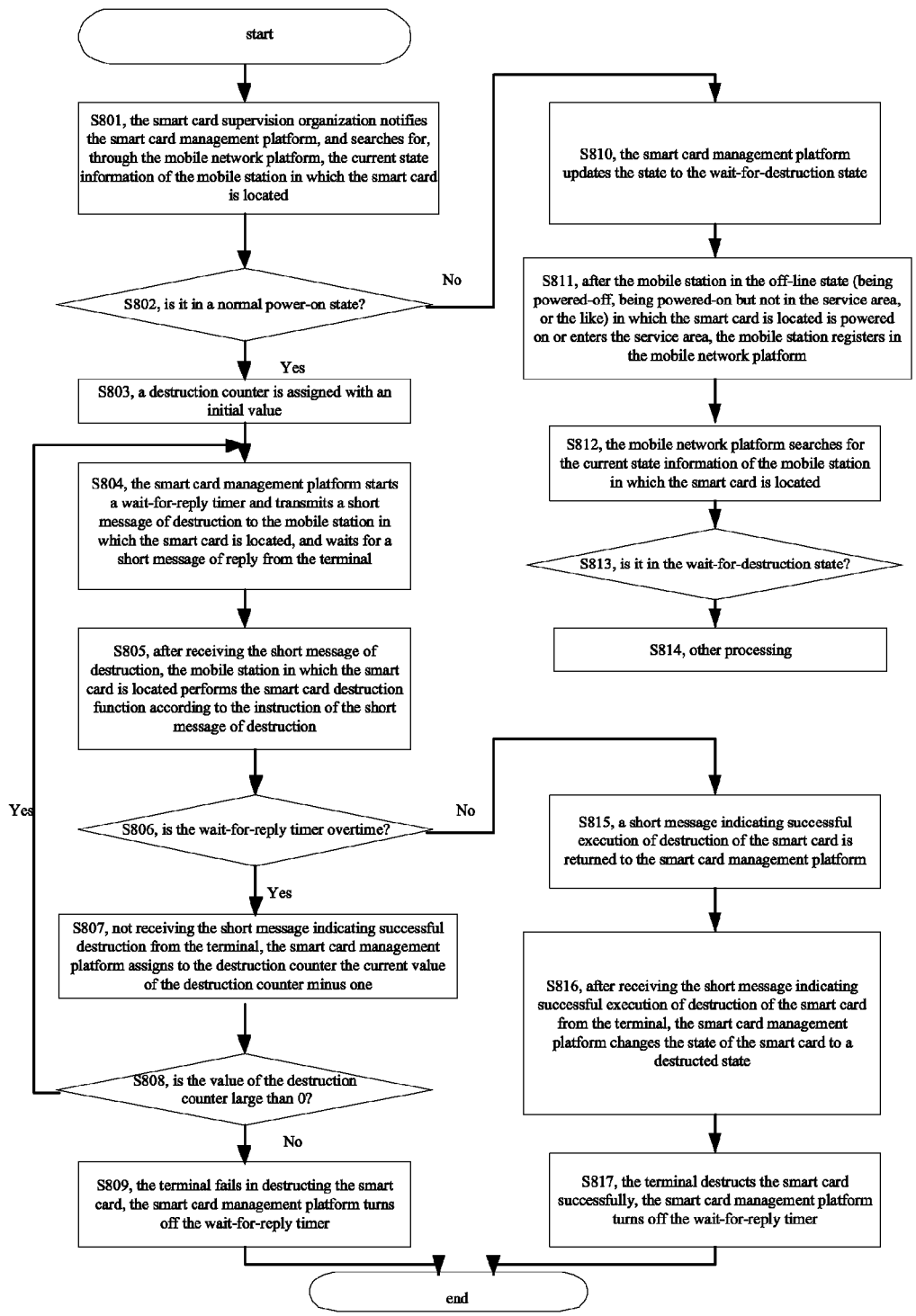
FIG. 8 is a preferable flowchart of the remote control method for a smart card according to an embodiment of the present invention.

FIG. 8 is a preferable flowchart of the remote control method of a smart card according to an embodiment of the present invention.

As shown in FIG. 8, the preferred method includes the steps as follows.

Step S801, the smart card supervision organization notifies the smart card management platform, and searches for, via the mobile network platform, the current state information of the mobile station in which the smart card is located.

Step S802 to step S817 are the same as step S705 to step S721 in FIG. 7.

Figure 9:
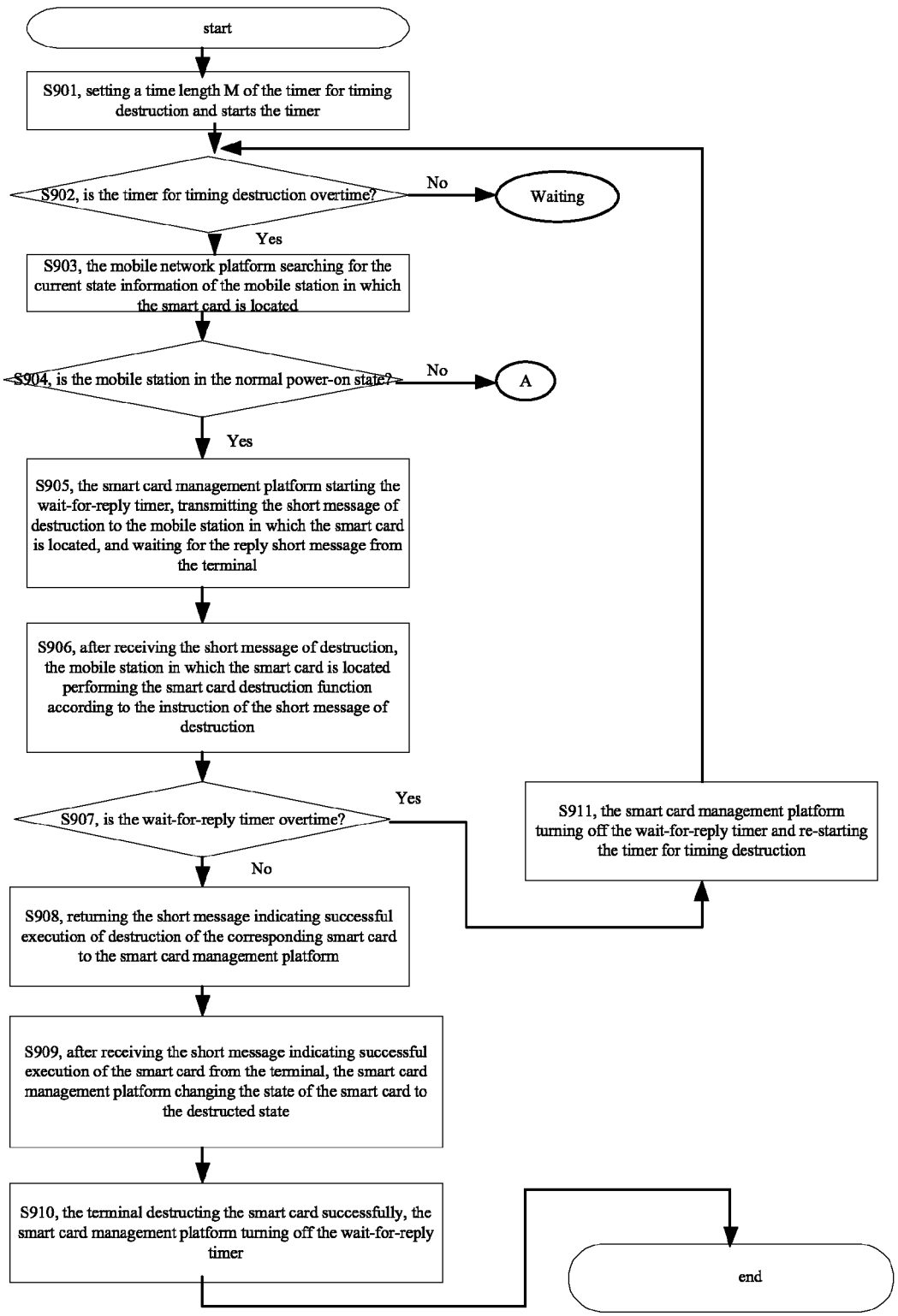
FIG. 9 is a preferable flowchart of the remote control method for a smart card according to an embodiment of the present invention.

FIG. 9 is a preferable flowchart of the remote control method for a smart card according to an embodiment of the present invention.

The smart card management platform also includes a timer for timing destruction, and it further includes starting the process of timing destruction of the smart card after the terminal fails in destructing the smart card.

As shown in FIG. 9, the timing destruction process includes the steps as follows.

Step S901, a time length M is set for the timer for timing destruction, and the timer is started.

Step S902, it is judged whether the timing destruction is overtime, if yes, step S903 is carried out, otherwise, enters a wait state.

Step S903, the mobile network platform searches for the current state information of the mobile station in which the smart card is located.

Step S904, it is judged whether the mobile station is in the normal power-on state, if the mobile station in which the smart card is located is in the normal power-on state, step S905 is carried out, otherwise, if the mobile station in which the smart card is located is in the off-line state, enters a state A of whether to destruct.

Step S905, the smart card management platform starts the wait-for-reply timer, transmits the short message of destruction to the mobile station in which the smart card is located, and waits for the reply short message from the terminal.

Step S906, after receiving the short message of destruction, the mobile station in which the smart card is located performs the corresponding smart card destruction function according to the instruction of the short message of destruction.

Step S907, it is judged whether the wait-for-reply timer regarding the smart card is overtime, if yes, step S911 is carried out, otherwise, step S908 is carried out.

Step S908, after the smart card is successfully destructed, the short message indicating success is returned to the smart card management platform.

Step S909, after receiving the short message indicating successful execution of the smart card from the terminal, the smart card management platform changes the state of the smart card to the destructed state, and then step S910 is carried out.

Step S910, the terminal destructs the smart card successfully, the smart card management platform turns off the wait-for-reply timer, and the process of destructing the smart card is ended.

Step S911, the smart card management platform turns off the wait-for-reply timer and re-starts the timer for timing destruction.

Figure 10:
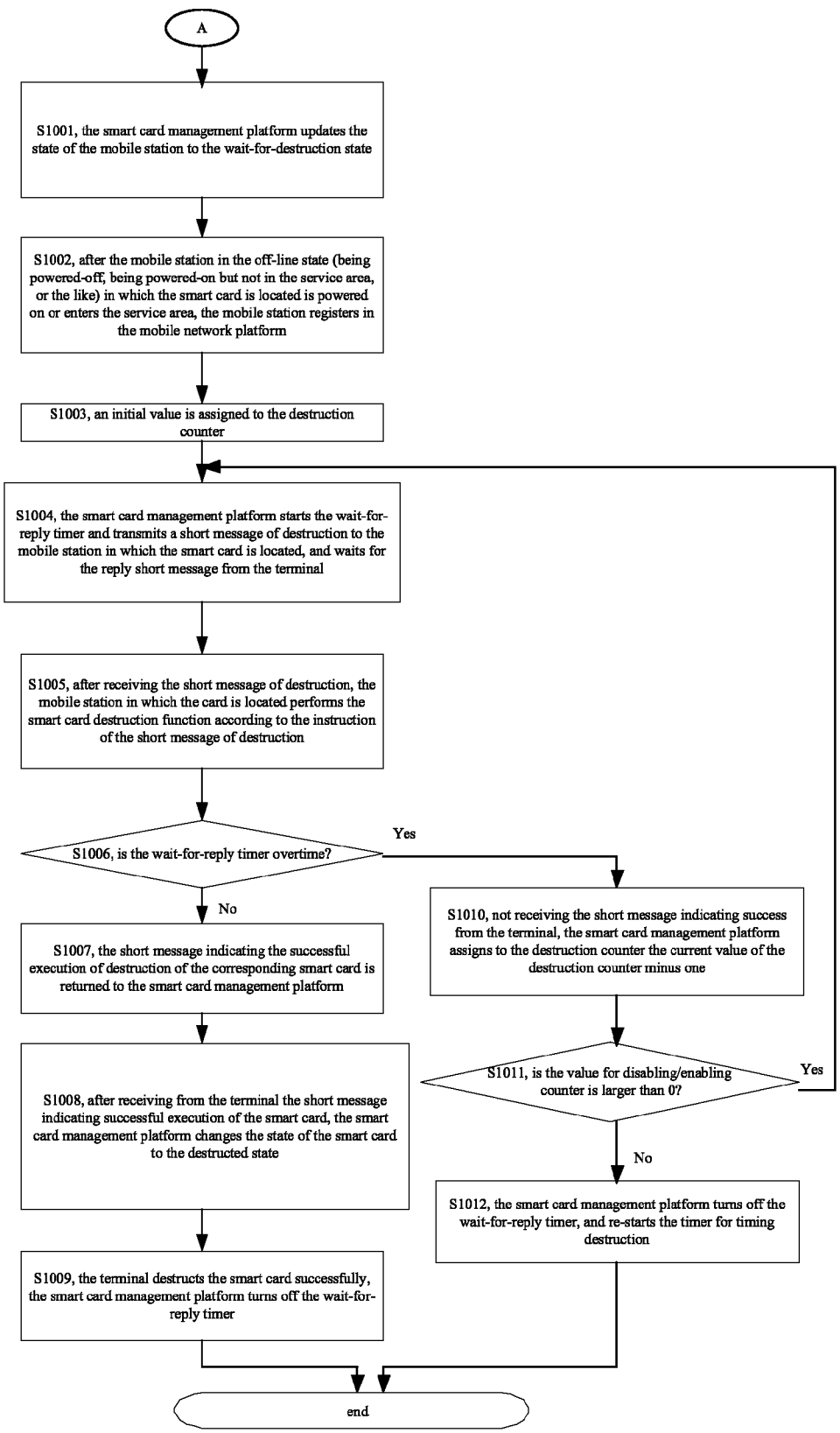
FIG. 10 is a preferable flowchart of the remote control method for a smart card according to an embodiment of the present invention.

FIG. 10 is a preferable flowchart of the remote control method for a smart card according to an embodiment of the present invention.

As shown in FIG. 10, in the method, after the mobile network platform searches for the current state information of the mobile station in which the smart card is located, and when the mobile station is in the abnormal power-on state, the following steps are included.

Step S1001, if the mobile station in which the smart card is located is in the off-line state (being powered-off, being powered-on but not in the service area, or the like), the smart card management platform updates the state of the mobile station to the wait-for-destruction state.

Step S1002, after the mobile station, in the off-line state (being powered-off, being powered-on but not in the service area, or the like), in which the smart card is located is powered on or enters the service area, the mobile station registers in the mobile network platform.

Step S1003, an initial value is assigned to the destruction counter.

Step S1004, the smart card management platform starts the wait-for-reply timer, transmits a short message of destruction to the mobile station in which the smart card is located, and waits for the reply short message from the terminal.

Step S1005, after receiving the short message of destruction, the mobile station in which the smart card is located performs the smart card destruction function according to the instruction of the short message of destruction.

Step S1006, it is judged whether the wait-for-reply timer is overtime, if not, step S1007 is carried out, otherwise, step S1010 is carried out.

Step S1007, the short message indicating the successful execution of destruction of the corresponding smart card is returned to the smart card management platform.

Step S1008, after receiving the short message indicating successful execution of the smart card from the terminal, the smart card management platform changes the state of the smart card to the destructed state.

Step S1009, the terminal destructs the smart card successfully, and the smart card management platform turns off the wait-for-reply timer.

Step S1010, the short message indicating success is not received from the terminal, then the smart card management platform assigns the current value of the destruction counter minus one to the destruction counter.

Step S1011, it is judged whether the value for disabling/enabling counter is larger than 0, if yes, step 1004 is carried out, otherwise, step S1012 is carried out.

Step S1012, the smart card management platform turns off the wait-for-reply timer, and re-starts the timer for timing destruction.

Preferably, in the method, the execution of corresponding command for destruction of the smart card to destruct the smart card in FIG. 2 and FIG. 7 includes: disabling the smart card in a manner of destructing physical hardware, or destructing the smart card in a manner of executing a preset software executive (device).

Wherein, the preset software executive (device) can be set either in the smart card, or in the mobile station in which the smart card is located.

For example, a battery voltage of a mobile phone is directly applied to a power supply circuit of the smart card, as the normal voltage of the smart card is relatively low (1.8v/3v), while a working voltage of the mobile terminal is generally at 3.6v-4.2v, (a card of 5v can be destructed in other manners), the smart card can be destructed directly and is irreparable.

Software executive is preset in the terminal in which the smart card is located, and the step of mobile station executing the destruction command includes: destructing payment data (the memory in which the payment data is located) in the smart card; executing the preset software executive in the terminal to destroy the payment data in the smart card, wherein the smart card program presets the software executive in the smart card.

Preferably, the step of the mobile station executing the command of destructing the payment data in the smart card includes: duplicating the preset software executive program in the smart card to the terminal; destructing the payment data (the memory in which the payment data is located) in the smart card; and executing the preset software executive in the terminal to destruct the duplication program of the smart card.

For example, the smart card is destructed through a software program, wherein a software program is written, in which PUK code is inputted for more than 10 times, then the smart card is locked permanently and the locking is not releasable, i.e. the smart card is destructed.

Preferably, the smart card management platform searches for the current state information of the mobile station in which the smart card is located through the mobile network platform. The mobile network platform finds the state information of the mobile station according to the mobile identification code and location area information of the mobile station.

Preferably, when the mobile station, in the off-line state (being powered-off, being powered-on but not in the service area, or the like), in which the smart card is located registers in the mobile network platform after it is powered on or enters the service area, if the mobile network platform finds that the mobile station in which the smart card is located is in the wait-for-destruction state, an initial value is assigned to the destruction counter.

According to another aspect of the present invention, a method for realizing remote destruction of an electronic payment smart card based on a short message is provided (this is the case that the user's smart card is destructed directly by the management platform without an application from the user, which is corresponding to the situation that the user uses a smart card illegally).

Figure 3:
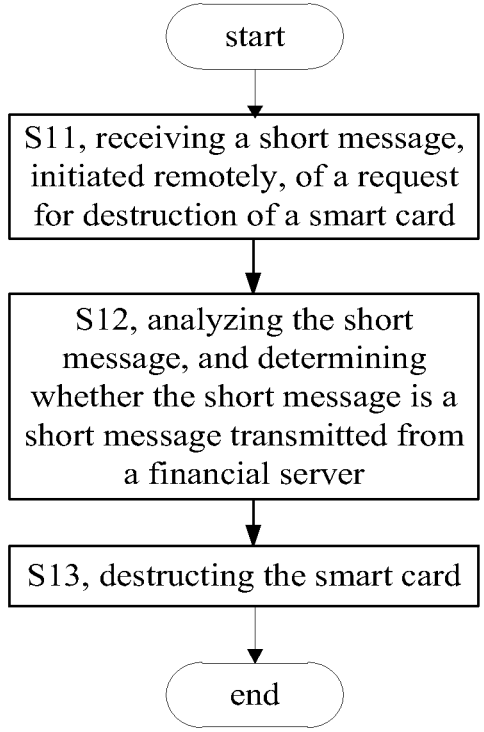
FIG. 3 is a preferable flowchart of the remote control method for a smart card according to an embodiment of the present invention.

FIG. 3 is a preferable flowchart of the remote control method for a smart card according to an embodiment of the present invention.

As shown in FIG. 3, the method includes the steps as follows.

Step S11, a short message, which is initiated remotely, of requesting for destruction of a smart card is received.

Preferably, the smart card supervision organization (such as the payment system platform or the smart card management platform) notifies the smart card management platform to process, upon finding that the user uses the smart card illegally.

Step S12, the short message is analyzed, and it is determined whether the short message is a short message transmitted from a financial server.

Preferably, the smart card management platform carries out short message interactive with a terminal side in which the smart card is located via the mobile network platform to implement the destruction of the smart card.

Step S13, the smart card is destructed.

Preferably, the terminal side accomplishes the destruction of the smart card.

In the above, regarding the details of step S11, reference can be made to step S701 to step S721 in FIG. 7.

Preferably, according to another aspect of the present invention, a system for realizing remote destruction of an electronic payment smart card based on a short message is provided, which includes:

a mobile terminal (side) which includes a mobile terminal and an external smart card chip or an embedded smart card with payment function, wherein the mobile terminal side communicates with the smart card management platform through the mobile network platform (the mobile network access point, for example, essential equipment of the mobile network, such as a base station, a short message gateway, and a network switcher, etc.), receives and processes a short message of destruction of a smart card transmitted by the smart card management platform to the mobile terminal;

a smart card management platform which receives the user's request for destruction of the smart card, communicates with the mobile terminal side through the mobile network platform, and transmits, through the mobile network platform, a short message of destruction of a smart card to the mobile terminal side, when receiving from the user an application for destruction of the smart card.

As described above, the smart card includes, but is not limited to, sim cards, R-UIM cards, usim cards, csim cards, UICC cards, java cards, financial cards, transportation cards, the prepaid cards, and combined cards of these cards.

The mobile terminal includes, but is not limited to, terminals with a standard such as GSM, CDMA, WCDMA, Td-Scdma, cdma2000, data card, fixed station, LTE and LTE+, and multi-mode terminals of arbitrary combination of them.

In addition, in the embodiments of the present invention, the interaction between the smart card management platform and the terminal side can be implemented through Over The Air (referred to as OTA) technology, wherein the OTA technology can include a Bearer Independent Protocol (referred to as BIP) and a short message channel.

Device Embodiment

According to an embodiment of the present invention, a remote control system for a smart card is provided.

The preferred remote control system for a smart card according to an embodiment of the present invention includes: a request device, a communication device, and an execution device.

Specifically, the request device is used for obtaining the user's request; the communication device is used in the mobile network platform for processing the interaction between the mobile network platform and the mobile station, the communication between the mobile network platform and the card management platform, the data synchronization and so on; and the execution device is used in the mobile station for locking and unlocking the smart card.

Figure 11:
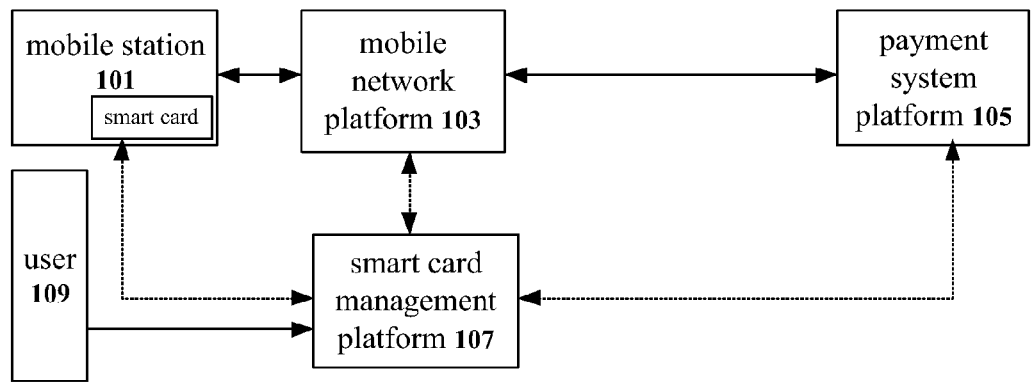
FIG. 11 is a schematic diagram of the preferable remote control system for a smart card according to an embodiment of the present invention.

FIG. 11 is a schematic diagram of the preferable remote control system for a smart card according to an embodiment of the present invention.

As shown in FIG. 11, the system includes: a mobile network platform 103 and a mobile station 101.

The mobile network platform 103 is used for transmitting to the mobile station a short message command of destruction; and the mobile station 101 is used for executing the command of destruction so as to destroy the smart card.

Preferably, the user 109 applies to the smart card management platform 107 for destruction of the smart card, and the smart card management platform 107 searches for, through the mobile network platform, the current state information of the mobile station in which the smart card is located. If the mobile station in which the smart card is located is in the normal power-on state, the mobile network platform 103 directly transmits a destruction command to the mobile station 101 in which the smart card is located, after executing the destruction command and destructing the smart card, the mobile station 101 in which the smart card is located returns a message of success to the mobile network platform 103, and the mobile network platform 103 changes the state of the smart card to the destructed state and notifies the smart card management platform 107 to update the state of the smart card to the destructed state. If the mobile station 101 in which the smart card is located is in the off-line state (being powered-off, being powered-on but not in the service area, or the like), the mobile network platform 103 updates its state to the wait-for-destruction state, and notifies the smart card management platform 107 to update the state database.

Preferably, the system of the present invention includes: a mobile terminal side which includes a mobile terminal and an external smart card chip or an embedded smart card with payment function, wherein the mobile terminal side communicates with the smart card management platform through the mobile network platform, receives and processes a short message of destruction of a smart card transmitted by the smart card management platform to the mobile terminal side, and performs a security authentication on the source of the short message; a smart card management platform which receives the user's request for destruction of a smart card, and is responsible for the issuance and management of the smart card, including a smart card management system, a key management system, a certificate management system and so on, wherein the smart card management platform manages the key, the certificate, the resources and the life cycle of the smart card, creates security domains of other application providers, and exchanges application data with other security domains. The smart card management platform can also include a smart card application management system which is responsible for providing and managing the smart card issuers' own applications or the applications under the trusteeship of the smart card issuers. The smart card management platform can also include an application provider management platform, through which information related to the application providers can be recorded, and the service privileges of the application providers can be stipulated. The smart card management platform communicates with the mobile terminal side through the mobile network platform, and transmits, through the mobile network platform, a particular short message of destruction of a smart card to the mobile terminal when receiving from the user an application for destruction of the smart card. The mobile network platform is a wireless network bearer for implementing the service, and includes a mobile network access point, for instance, essential equipment for a mobile network (such as Gsm network, GPRS network, Wcdma network, and cdma network) such as a base station, a short message gateway, a switcher and so on.

In addition to the above, the system can also include a payment system platform which includes a payment platform and a payment application management platform. The payment platform is a supportive platform for electronic payment transactions. The payment application management platform is responsible for the providing and management functions of the electronic payment application, and includes an application management system, a key management system and a certificate management system. Moreover, the payment application management platform provides a variety of service applications, manages the corresponding security domains in the smart card, controls the application key, certificate and data of the security domains, and provides safe downloading function of the applications. The application providers can be operators, banks, bus companies, retailers, etc.

Figure 12:
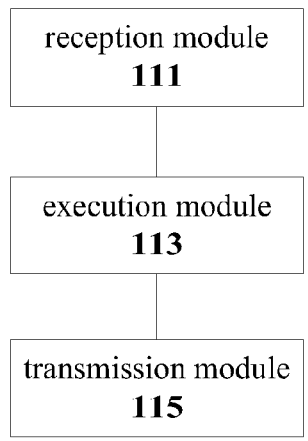
FIG. 12 is a schematic diagram of the mobile station according to an embodiment of the present invention.

FIG. 12 is a schematic diagram of the mobile station according to an embodiment of the present invention.

As shown in FIG. 12, the mobile station includes: an execution module 111 and a transmission module 113.

The execution module 111 is used for executing the destruction of the smart card; and the transmission module 113 is used for transmitting a message of successful destruction.

Figure 13:
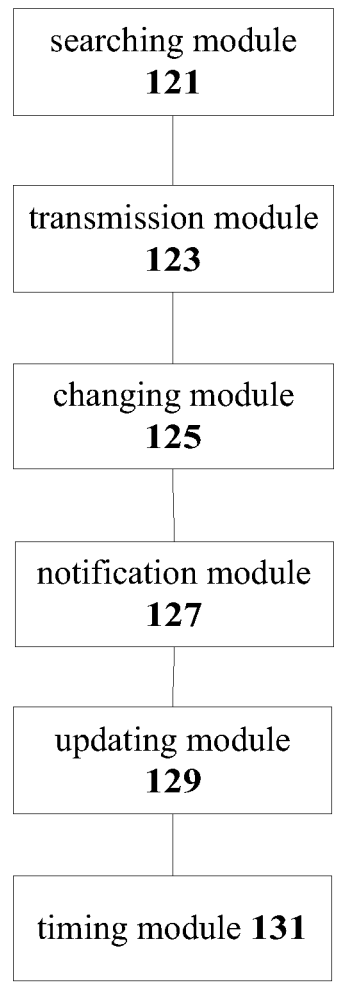
FIG. 13 is a schematic diagram of the mobile network platform according to an embodiment of the present invention.

FIG. 13 is a schematic diagram of the mobile network platform according to an embodiment of the present invention.

As shown in FIG. 13, the mobile network platform includes: a searching module 121, a transmission module 123, a changing module 125, a notification module 127, an updating module 129 and a timing module 131.

Specifically, the searching module 121 is used for searching for the state information of the mobile station in which the smart card is located; the transmission module 123 is used for transmitting, when the state information of the mobile station indicates that the mobile station is in the normal-use state, the destruction command to the mobile station; the changing module 125 is used for changing the state of the smart card to the destructed state; the notification module 127 is used for notifying the smart card management platform to update the state of the smart card to the destructed state; the updating module 129 is used for updating, when the state information indicates that the mobile station in which the smart card is located is in the offline state, its state to the wait-for-destruction state; and the timing module 131 is used for setting the time at which the destruction command is transmitted to the mobile station.

Through the present invention, when the payment user terminal is robbed, lost, stolen or seriously illegally used, losses can be avoided, the safety balance between the system load and the user smart card is considered comprehensively, the impact on the service flow caused by loss and delay in the process of transmitting the short message is reduced, which, thereby, accomplishes the destruction of the smart card, and provides relatively high flexibility to the payment system.

The descriptions above are only preferable embodiments of the present invention, which are not used to restrict the present invention. For those skilled in the art, the present invention may have various changes and variations. Any modifications, equivalent substitutions, improvements etc. within the spirit and principle of the present invention are all concluded in the scope of the claims of the present invention.

What is claimed is:

1. A remote control method for a smart card included in a terminal side, the method comprising:
   a smart card management platform receiving a request for destruction of the smart card from a user, wherein the state of the smart card maintained in a network side state machine comprises: a normal-use state, a wait-for-destruction state and a destructed state; and
   the smart card management platform carrying out short message interactive processing with the terminal side via a mobile network platform according to the request, to make the terminal side destruct the smart card;
   wherein the smart card management platform carrying out short message interactive processing with the terminal side via the mobile network platform according to the request, to make the terminal side destruct the smart card comprises:
   when the state of the smart card maintained in the network side state machine is the normal-use state, if the mobile station in which the smart card is located is in a normal power-on state, in response to the request for destruction, the smart card management platform transmitting a short message of destruction to the terminal station in which the smart card is located, the mobile station receiving the short message of destruction transmitted by the mobile network platform, executing, according to the short message of destruction, a destruction command to destruct the smart card, and returning a short message of successful execution to the smart card management platform or the mobile network platform, the smart card management platform or the mobile network platform updating the state of the smart card maintained in the network side state machine to the destructed state;
   when the state of the smart card maintained in the network side state machine is the normal-use state, if the mobile station in which the smart card is located is in an off-line state, in response to the request for destruction, the smart card management platform or the mobile network platform updating the state of the smart card maintained in the network side state machine to the wait-for-destruction state;
   when the state of the smart card maintained in the network side state machine is the wait-for-destruction state, if the mobile station in which the smart card is located is in the off-line state but is found later, the state of the smart card maintained in the network side state machine being updated to the normal-use state;
   when the state of the smart card maintained in the network side state machine is the wait-for-destruction state, if the mobile station, in which the smart card is located, in the off-line state restores to a normal-use state and registers in the mobile network platform, upon the registration, the mobile network platform transmitting the short message command of destruction to the mobile station in which the smart card is located, and the mobile station executing the short message command of destruction to destruct the smart card and returning the short message of successful execution to the smart card management platform or the mobile network platform, and the smart card management platform or the mobile network platform updating the state of the smart card maintained in the network side state machine to the destructed state.

2. The method according to claim 1, wherein the step of the smart card management platform carrying out short message interactive processing with the terminal side via a mobile network platform according to the request comprises:
   if the smart card management platform does not receive, in a pre-determined time period, a short message of successful execution returned by the terminal side, the smart card management platform continuing transmission of the short message of destruction to the terminal side via the mobile network platform.

3. The method according to claim 2, wherein the step of the mobile station executing a destruction command to destruct the smart card comprises:
   the mobile station destructing the smart card in a manner of destructing hardware of the smart card; or
   the mobile station destructing the smart card in a manner of executing a preset software executive.

4. The method according to claim 2, wherein the step of the smart card management platform continuing transmission of the short message of destruction to the terminal side via the mobile network platform comprises:
   if times for the smart card management platform transmitting the short message of destruction to the terminal side via the mobile network platform exceed set times, the smart card management platform transmitting the short message of destruction to the terminal side at a pre-determined time interval; or
   if a mobile station in which the smart card is located is in an off-line state, the smart card management platform updating a state of the smart card management platform to a wait-for-destruction state.

5. The method according to claim 4, wherein the method further comprises:
   if the mobile station, in which the smart card is located, in the off-line state is powered on or enters a service area, the smart card management platform continuing transmission of the short message of destruction to the mobile station in which the smart card is located.

6. The method according to claim 5, wherein the step of the smart card management platform continuing transmission of the short message of destruction to the mobile station in which the smart card is located comprises:
   if times for the smart card management platform transmitting the short message of destruction to the terminal side exceed set times, the smart card management platform transmitting the short message of destruction to the terminal side at a pre-determined time interval.

7. The method according to claim 1, wherein the off-line state comprises one of the following:
   the mobile station is in a power-off state;
   the mobile station is not in a service area.

8. The method according to claim 1, wherein after the smart card management platform receives an application from the user, the method further comprises:
   the smart card management platform judging whether the smart card is valid.

9. The method according to claim 1, wherein before the smart card management platform carries out short message interactive processing with a terminal side via a mobile network platform according to the request, the method further comprises:
   the mobile network platform performing security authentication with the terminal side;
   wherein the step of the mobile network platform performing security authentication with the terminal side comprises: after receiving a short message of destruction, the mobile station in which the smart card is located determining whether the short message of destruction is from the smart card management platform; if not, processing as an ordinary short message; if yes, performing corresponding smart card destruction operation according to an instruction of the short message of destruction, and the mobile station in which the smart card is located returning a short message of successful execution to the smart card management platform.

10. The method according to claim 1, wherein after the smart card management platform receives the request for destruction of the smart card from the user, the method further comprises:
the smart card management platform searching for state information of the mobile station in which the smart card is located via the mobile network platform;
wherein the step of the smart card management platform searching for state information of the mobile station in which the smart card is located via the mobile network platform comprises: the smart card management platform searching for, via the mobile network platform, state information of the mobile station in which the smart card is located according to a mobile identification code and location area information of the mobile station.

11. The method according to claim 1, wherein the method further comprises:
the smart card management platform transmitting an instruction of destruction to the terminal side through Over the Air technology, wherein the Over the Air technology comprises a bearer independent protocol.

12. A remote control method for a smart card, comprising:
a smart card supervision platform notifying, if the smart card supervision platform finds that a user uses the smart card illegally, a smart card management platform to destruct the smart card, wherein the state of the smart card maintained in a network side state machine comprises: a normal-use state, a wait-for-destruction state and a destructed state; and
the smart card management platform carrying out short message interactive processing with a terminal side to make the terminal side accomplish the destruction of the smart card;
wherein the smart card management platform carrying out short message interactive processing with a terminal side to make the terminal side accomplish the destruction of the smart card comprises:
when the state of the smart card maintained in the network side state machine is the normal-use state, if the mobile station in which the smart card is located is in a normal power-on state, in response to the request for destruction, the smart card management platform transmitting a short message of destruction to the terminal station in which the smart card is located, the mobile station receiving the short message of destruction transmitted by the mobile network platform, executing, according to the short message of destruction, a destruction command to destruct the smart card, and returning a short message of successful execution to the smart card management platform or the mobile network platform the smart card management platform or the mobile network platform updating the state of the smart card maintained in the network side state machine to the destructed state;
when the state of the smart card maintained in the network side state machine is the normal-use state, if the mobile station in which the smart card is located is in an off-line state, in response to the request for destruction, the smart card management platform or the mobile network platform updating the state of the smart card maintained in the network side state machine to the wait-for-destruction state;
when the state of the smart card maintained in the network side state machine is the wait-for-destruction state, if the mobile station in which the smart card is located is in the off-line state but is found later, the state of the smart card maintained in the network side state machine being updated to the normal-use state;
when the state of the smart card maintained in the network side state machine is the wait-for-destruction state, if the mobile station, in which the smart card is located, in the off-line state restores to a normal-use state and registers in the mobile network platform, upon the registration, the mobile network platform transmitting the short message command of destruction to the mobile station in which the smart card is located, and the mobile station executing the short message command of destruction to destruct the smart card and returning the short message of successful execution to the smart card management platform or the mobile network platform, and the smart card management platform or the mobile network platform updating the state of the smart card maintained in the network side state machine to the destructed state.

13. The method according to claim 12, wherein the terminal side comprises a mobile station and the smart card, and the step of the smart card management platform carrying out short message interactive processing with a terminal side further comprises:
the smart card management platform searching for state information of the mobile station in which the smart card is located via a mobile network platform 14. The method according to claim 13, wherein
the step of the smart card management platform searching for state information of the mobile station in which the smart card is located via the mobile network platform comprises: the smart card management platform searching for, via the mobile network platform, state information of the mobile station in which the smart card is located according to a mobile identification code and location area information of the mobile station in which the smart card is located.

15. A mobile network platform, comprising a hardware processor which is configured to execute program units stored in a memory connected to the hardware processor, wherein the program unit comprises:
a transmission module, configured to transmit a short message command of destruction to a mobile station; and
a changing module, configured to update a state of a smart card, wherein the state of the smart card maintained in a network side state machine comprises: a normal-use state, a wait-for-destruction state and a destructed state;
wherein the changing module is configured to:
when the state of the smart card maintained in the network side state machine is the normal-use state, if the mobile station in which the smart card is located is in a normal power-on state, update the state of the smart card maintained in the network side state machine to the destructed state after the smart card management platform transmits a short message of destruction to the terminal station in which the smart card is located, the mobile station receives the short message of destruction transmitted by the mobile network platform, executes, according to the short message of destruction, a destruction command to destruct the smart card, and returns a short message of successful execution to the mobile network platform;
when the state of the smart card maintained in the network side state machine is the normal-use state, if the mobile station in which the smart card is located is in an off-line state, update the state of the smart card maintained in the network side state machine to the wait-for-destruction state;

when the state of the smart card maintained in the network side state machine is the wait-for-destruction state, if the mobile station in which the smart card is located is in the off-line state but is found later, update the state of the smart card maintained in the network side state machine to the normal-use state;

when the state of the smart card maintained in the network side state machine is the wait-for-destruction state, if the mobile station, in which the smart card is located, in the off-line state restores to a normal-use state and registers in the mobile network platform, upon the registration, update the state of the smart card maintained in the network side state machine to the destructed state after the mobile network platform transmits the short message command of destruction to the mobile station in which the smart card is located, and the mobile station executes the short message command of destruction to destruct the smart card and returns the short message of successful execution to the mobile network platform.

16. The mobile network platform according to claim 15, wherein the mobile network platform further comprises:

the mobile network platform further comprises: a timing module, configured to set a time at which the short message command of destruction is transmitted to the mobile station; and/or the transmission module is further configured to transmit an instruction of destruction through Over the Air technology, wherein the Over the Air technology comprises a bearer independent protocol.

\* \* \* \* \*